United States Patent Office 3,786,025
Patented Jan. 15, 1974

3,786,025
RAPID CURING RESIN COMPOSITIONS COMPRISING A PHENOL-ALDEHYDE CONDENSATION POLYMER MODIFIED WITH AN AMINONAPHTHALENE
Harlan G. Freeman, Gene F. Baxter, and George T. Tiedeman, Seattle, Wash., assignors to Weyerhaeuser Company, Tacoma, Wash.
No Drawing. Continuation-in-part of abandoned application Ser. No. 821,998, May 5, 1969. This application June 1, 1971, Ser. No. 148,907
Int. Cl. C08g 9/06
U.S. Cl. 260—51.5
45 Claims

ABSTRACT OF THE DISCLOSURE

Described herein are reaction products having particular utility as rapid curing adhesives for wood and other materials, and processes for making the resin compositions. The products are made by reacting an aldehyde condensation polymer having reactive alkylol groups, such as a phenol-formaldehyde condensation polymer, with an aminonaphthalene having the formula:

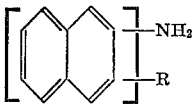

where R may be amino in any open ring position or hydroxyl in the 2, 5 and 8 ring positions when the amino group is in the 1 position, to obtain an amine-modified polymer. When the resulting reaction product is blended with an appropriate curing agent, such as an aldehyde, the compositions cure very rapidly at ambient temperature. When pieces of wood or other materials are spread with the preferred adhesives employing the resin compositions of this invention and brought into contact with another wood surface the bond strength develops within minutes. The durability, strength and flexibility of the adhesives of this invention under adverse weathering conditions are excellent.

CROSS REFERENCE

This application is a continuation-in-part of a similarly entitled earlier copending application Ser. No. 821,998, filed May 5, 1969 now bandoned.

BACKGROUND OF THE INVENTION

This invention relates to the preparation of rapid curing resin compositions, to the resin compositions per se, and to the use of these resin compositions as adhesives.

For many years the adhesives used to bond wood together to make plywood, laminated beams, furniture, etc., have employed aldehyde condensation polymers of phenol, urea, resorcinol, etc., such as phenol-formaldehyde resins, resorcinol-formaldehyde resins, phenol-resorcinol-formaldehyde resins, urea-formaldehyde resins, and others. Although each of these resins has advantageous characteristics, they all have relatively slow curing rates.

The slow cure rate of these resins has necessitated long press times with concurrent restriction on production when used in the manufacture of laminated beams, plywood and other construction uses. To overcome the slow cure rates, many modifications of the above resins have been proposed. Other resins such as the epoxies have been proposed, but their expense and certain of their physical properties have limited their use. The adhesives of this invention employ aldehyde condensation polymers modified with particular amines. These resins not only have rapid cure rates but develop adequate adhesive bond strengths in a short amount of time at ambient temperature, thereby eliminating the need for long press times and application of heat to develop sufficient bond strength.

Mazzucchelli et al., in U.S. Pat. 2,557,922, describe the preparation of modified phenol-formaledhyde condensation products by the inclusion of mono-aminodiphenyls, diaminodiphenyls, or aminodiphenylmethanes alone or as condensation products with formaldehyde. The compositions, when mixed with suitable fillers, are used primarily as electrical insulators.

Auer, in U.S. Pat. 2,309,088 teaches the manufacture of organic isocolloids through modification of resins with amine compounds. The isocolloids are useful, inter alia, as additives for varnishes to improve their alkali and hot and cold water resistance. Fusible phenolic resins containing a natural resin or resinous esters thereof are modified by Auer by heating with particular amines at elevated temperatures "to insure complete dissolution or dispersion of the modifying agent." It is not clear even to Auer whether any chemical reaction takes place between the phenolic resin and amine. However, if there was a reaction, the substituents such as carboxyl groups on the phenolic resins attributable to the natural resin or resinous esters thereof would result in the formation of amides, and not in the formation of the amine modified products of this invention. Amide modified condensation polymers have significantly lower reactivity for purposes of this invention than do amine modified condensation polymers, and are therefore to be avoided. Further, because Auer's phenolic resin starting materials are apparently permanently fusible, it can be inferred that they are novolaks and therefore contain no reactive alkylol groups, making them inappropriate for the practice of the present invention.

SUMMARY OF THE INVENTION

This invention relates to a process for the preparation of rapid curing resin compositions for use as adhesives, and to the resin compositions per se, and particularly to the addition of a curing agent to the reaction product of an aminonaphthalene with an aldehyde condensation polymer having reactive alkylol groups. This invention is also directed to a method of bonding a plurality of members, one to the other, comprising applying to a surface of a first member a first component comprising an aminonaphthalene modified aldehyde condensation polymer of this invention, applying to a surface of a second member a second component comprising a curing agent in an amount sufficient to cause said first component to become infusible, and assembling the first and second member so that the first and second components are brought into intimate reacting contact.

The resins of this invention are prepared by reacting together an aldehyde condensation polymer having reactive alkylol groups with an aminonaphthalene having the formula:

where R may be amino in any open ring position or hydroxyl in the 2, 5 and 8 ring positions when the amino group is in the 1 position, to produce an amine-modified polymer. This resinous product is then blended with a sufficient amount of a curing agent to cause the resin to become infusible. On addition of the aldehyde to the amine-modified condensation polymer the material sets to an insoluble, infusible condition at ambient temperature. Optionally, heat may be applied to increase cure speed.

The resins can be used to bond wood to wood, metal to metal, wood to metal, fabric, and many other materials where durable, moisture-resistant, heat-resistant adhesive compositions are needed.

DESCRIPTION OF THE PREFERRED EMBODIMENTS

Many of the aldehyde condensation polymers of phenol, resorcinol, urea, and melamine have been widely used as adhesives and their properties are well known. The aldehyde condensation polymers which can be used in this invention have reactive alkylol groups, and are well known and commercially available. "Polymers," as used herein, means resinous mixtures which do not crystallize or have a sharp melting point. "Reactive alkylol groups" are alkylol groups capable of reacting with the amines used in this invention to modify the aldehyde condensation polymers. "Condensation" is used herein to mean a polymerization reaction in which a molecule, such as water, is eliminated and is to be distinguished from "addition" in which no by-product is formed. Further, the aldehyde condensation polymers used in this invention exclude those having dominant amide forming substituents.

Three classes of polymers are preferred: phenoplasts, aminoplasts, and ketone-aldehyde condensation polymers. They include such resins as the acid or base catalyzed phenol-aldehyde resins, urea-aldehyde resins, melamine-aldehyde resins, acetone-aldehyde resins, etc. The following references disclose methods of preparing the condensation resins useful in this invention: "The Chemistry of Synthetic Resins" by Carleton Ellis, Reinhold Publishing Co., 1935; "Phenolic Resin Chemistry" by N. J. L. Megson Academic Press Inc., New York, 1958; "Aminoplasts" by C. P. Vale, Cleaver-Hume Press, Ltd., London, England; and British Pat. 480,316.

Specifically, the aldehyde condensation polymers which can be used include (1) phenoplasts comprising the condensation polymers of an aldehyde such as formaldehyde with a phenolic type material having at least two positions ortho and/or para to the hydroxyl group open for reaction, such as phenol, phenol-resorcinol, xylenol, cresol, resorcinol, and their derivatives, (2) aminoplasts comprising the condensation polymers of an aldehyde such as formaldehyde with compounds such as benzoguanamine, dicyandiamide, urea, melamine-urea, melamine, and their derivatives, and (3) ketone-aldehyde condensation polymers such as acetone-formaldehyde, methyl ethyl ketone formaldehyde, methyl isobutyl ketone formaldehyde, and the like. The preferred resins are water-soluble, liquid, thermo-setting phenol-aldehyde resins. Novolacs, because they lack reactive alkylol groups, are not directly useful in this invention; they may be further reacted with aldehyde to convert them to useful resoles.

A preferred resin is an ortho-condensed phenolformaldehyde resin made by condensing 0.7 to 1.0 mole formaldehyde with 1 mole phenol in the presence of an ortho-directing catalyst such as calcium acetate. Such resins are known. Each of the aldehyde condensation polymers mentioned above is prepared and kept under conditions which prevent it from condensing to an infusible state by known methods. Although phenol is the preferred reactant, the phenolic resins may be modified by incorporating into them predetermined amounts of other monohydric phenols, other dihydric phenols such as resorcinol, or other polyhydroxy aromatic compounds.

The aldehyde used in preparation of the condensation polymer may be (1) monofunctional (i.e. a monoaldehyde), or (2) polyfunctional, having at least two aldehyde groups separated by at most one carbon atom, and can be, for instance, formaldehyde, paraformaldehyde, polyoxymethylene, trioxane, acrolein, and aliphatic or cyclic aldehydes such as glyoxal, acetaldehyde, propionaldehyde, butyraldehyde, and furfuraldehyde. Condensation when using formaldehyde, furfuraldehyde, paraformaldehyde, polyoxymethylene or trioxane, is generally accomplished with the use of a mildly acid, alkaline, or no catalyst. When using acrolein, glyoxal, acetaldehyde, propionaldehyde, or butyraldehyde, condensation is generally accomplished by combining the reactants in the presence of a strongly acid catalyst, neutralizing the reaction product, adding more aldehyde, and further reacting in the presence of a mildly acid, or alkaline, catalyst.

In the method of this invention the aldehyde condensation polymers mentioned above are modified by reaction with an aminonaphthalene to give an amine-modified polymer. It is necessary, in order to produce the low-temperature fast curing products of this invention, to first produce the aldehyde condensation polymer and then subsequently modify that polymer with the aminonaphthalene. Simultaneous reaction of all the reactants, i.e., phenol, formaldehyde and aminonaphthalene, produces an inferior, heterogeneous mass, i.e., comprising essentially an amine-formaldehyde condensation polymer containing free phenol.

The amount of amine used to react with the condensation polymer ranges from about 0.05 to 2.0 parts by weight of the amine to each part of the condensation polymer and preferably 0.1 to 1.0 part by weight of the amine to each part of the condensation polymer. More than 2.0 parts by weight of the amine to each part of the aldehyde condensation polymer can be used but there is little advantage in doing so. Most of the amino-naphthalene compounds disclosed react with the aldehyde condensation polymers at room temperature, but to insure complete reaction the mixtures are usually heated to reflux. Many of these reactions are exothermic in nature and cooling is required to control the reaction. This exothermic nature of the reaction is in some instances controlled by slow addition of the aminonaphthalene compound to the prepared polymer. It may be desirable under some circumstances, however, to add the polymer to solution of the aminonaphthalene compound. When the resin is ready to be used, a curing agent is blended therein.

The amines useful for modifying the aldehyde condensation polymers include aminonaphthalenes having the formula:

where R may be amino in any open ring position or hydroxyl in the 2, 5 and 8 ring positions when the amino groups is in the 1 position. The following amines are exemplary of those that may be used in the preparation of these resins: 1,5-diaminonaphthalene, 1,8-diaminonaphthalene, 1 - amino - 5-naphthol, 1-amino-2-naphthol, 2,7-diaminonaphthalene, and 1,2-diaminonaphthalene.

Aminonaphthalenes having the basic structures of those suggested above, but further substituted with non-interfering substituents, are also useful in this invention. By "non-interfering substituents" is meant those substituents which do not detract from the usefulness of the aminonaphthalenes in this invention. For example, halogen, ether, alkyl, aryl, cyano, sulfide, and mercaptan groups are non-interfering substituents which could be attached to the carbon rings of the suggested aminonaphthalene without reducing their usefulness, i.e. without significantly changing resin shelf life or adhesive cure speed. An aminonaphthalene containing such a non-interfering substituent which would be satisfactory for purposes of this invention is 1,5-diamino-3-methylnaphthalene.

Also useful for purposes of this invention are the acid salts of the suggested aminonaphthalenes, which salts are formed by the reaction of such aminonaphthalenes with nonoxidizing acids such as the hydrohalide acids, sulphuric acid, phosphoric acid, acetic acid, propionic acid, butyric acid, and the like. These salts are equivalent, for purposes of this invention, to the free aminonaphthalenes, and will normally be present in the reaction system when the aldehyde condensation polymer is reacted with the aminonaphthalene under acidic conditions.

The amine-modified aldehyde condensation polymers described above make up the first component of the resin composition. The first component is prepared so as to have a relatively long storage life so it can be shipped and stored for fairly long periods of time without gelation.

The second component of the resin composition is a curing agent which may be an alkylene donating compound, a diisocyanate, or an epoxide, used either alone, in combination with one another, and/or mixed with conventional thickening agents. The curing agent is blended with the modified aldehyde condensation polymer when needed. Other materials that readily donate alkylene bridges to the polymer system are also generally suitable. Reaction takes place at ambient temperature and the blended mixture gels rapidly to an insoluble, infusible state. The preferred resins of this invention set to an insoluble infusible state within a few minutes. "Insoluble" is intended to mean not soluble in common solvents such as water, alcohols, ketones, hydrocarbons, esters, glycols, and the like. Optionally, heat may be applied to the curing composition if desired to further decrease the required cure time.

Sufficient curing agent is added to the first component to form an insoluble infusible product. The amount of curing agent may range from 0.02 to 1.0 part by weight aldehyde per part of amine-modified condensation polymer; as stoichiometric proportions are approached and surpassed the completeness of the cure approaches 100%.

The preferred curing agent is an aldehyde such as formaldehyde, though the formaldehyde-forming compounds polyoxymethylene, trioxane and paraformaldehyde are quite satisfactory. Other aldehydes may be also used, for example, aliphatic or cyclic aldehydes having from 1 to 8 carbon atoms such as acrolein, glyoxal, acetaldehyde, propionaldehyde, butyraldehyde, and furfuraldehyde. Phenolic resoles and other similar polymers having free methylol groups are also efficient curing agents. Suitable diisocyanate curing agents comprise tolylene diisocyanate, phenylene diisocyanate, 1,6-hexane-diisocyanate, and the like, while suitable epoxy curing agents comprise the diglycidyl ether of bisphenol A, epoxidized phenolic novolacs, epoxidized polyglycols and the like.

When the first component comprising the amine-modified condensation polymer and the second component comprising the aldehyde are mixed together the composition becomes infusible in a very short period of time. When bonding materials together the two components are kept separate until they are needed. They are then intimately mixed and spread on the material to be bonded by any conventional means. An automatic mixing-dispensing gun is most useful in this regard.

Certain of the resin compositions of this invention have such rapid cure times that they begin to cure before they can be spread on the material to be bonded. To overcome this problem the first component can be spread on one surface of the material to be bonded and the second component spread on the second surface to be bonded. Such a process is described in U.S. Pat. No. 2,557,826 using phenol-resorcinol-formaldehyde resins. When the surfaces are brought into contact the first and second resin components react forming an infusible glue line between the materials.

If desired, other ingredients can be added to the resin compositions. Such ingredients include fillers, pigments, plasticizers, and the like in amounts ordinarily employed for such purposes.

The compositions of this invention do not need additional catalyst or heat to cure them. They are curable at ambient temperatures and in very short time periods after mixing of the two components. Additionally, the resin compositions develop bond strength sufficient to hold articles together in a relatively short amount of time.

The following examples illustrate this invention. Parts and percents where used are intended to be parts and percents by weight, unless otherwise specified.

Example 1

This example illustrates the fast cure rates of the resin compositions of this invention. Cure rate was determined by means of "gel" time. Gel time was determined by weighing out a 10-gm. aliquot of the first component, adjusting the pH to the desired point, and mixing the second component with the first component. The time elapsed from mixing to gelling of the composition is termed "gel time."

In each instance, the compositions were formulated by mixing an amine-modified phenol-formaldehyde polymer with additional formaldehyde. The phenol-formaldehyde polymer was made by mixing 42.06 parts by weight phenol, 4.51 parts water, 11.35 parts flake paraformaldehyde (91%) and 0.46 part calcium acetate monohydrate. The mixture was brought to reflux (approximately 109° C.) in about 60 minutes at a uniform rate and held at reflux for 120 minutes. To 100 grams of this prepolymer was added 0.305 mole of the respective aminonaphthalenes shown in Table I. The mixture in each case was refluxed for 2.25 hours, cooled, and 26.3 grams of methanol stirred into the mixture. A 10-gram aliquot of the amine-modified resin was then weighed out, the pH adjusted to the desired point, and 2.5 ml. of 55% formaldehyde in methanol-water solution added. The mixture was stirred rapidly until gelled, and the time recorded. The solution pH has some effect on the gel time of the resins. This pH effect is dependent primarily on the particular amine used but also on the solvent used and the concentration of the amine. Table I lists the amines used, the gel time and the pH range over which the gel times were obtained.

TABLE I

| Compound | Gel time | pH range |
|---|---|---|
| 1,5-diaminonaphthalene | Less than 60 sec | 2–12 |
| 1,8-diaminonaphthalene | Less than 100 sec | 1–10 |
| 2,7-diaminonaphthalene | Less than 70 sec | 3–10 |
| 1,2-diaminonaphthalene | Less than 100 sec | 7 |
| 1-amino-5-naphthol | do | 2.5–10.5 |
| 1-amino-2-naphthol | do | 6 |

Example 2

A mixture of 100 grams of high solids phenolformaldehyde prepolymer as described in Example 1 and 0.305 mole of 1,8-diaminonaphthalene were refluxed for 2.25 hours, cooled, and 26.3 grams methanol stirred into the mixture. A 10-gram aliquot of the amine-modified resin was weighed out and 5.0 grams of a hardener added, the hardener comprising a solution of 55% formaldehyde in methanol and water thickened with a small quantity of refined chrysotile asbestos (96.4% formaldehyde solution and 3.6% asbestos.) The adhesive composition was used in a standard cross-lap test (see Marra, A., "Geometry as an Independent Variable in Adhesive Joint Studies," Forest Products Journal, vol. XII, No. 2, pp. 81–90, 1962).

The cross-lap test is conducted by spreading the adhesive composition on the central area of a piece of Douglas fir wood 1" wide by approximately ¾" thick and 2¾" long. A similar piece of Douglas fir wood is immediately laid over the first with the grain direction at right angles. A measured quantity of adhesive may be used or an excess may be applied with the surplus resin allowed to squeeze out of the joint. The latter method has been used for the examples given here. As soon as the cross-lap is laid on the first piece, a pressure of 40 pounds is applied for the desired length of time. The joint is then broken in tension and the bond strength recorded. At the end of 12 minutes press time the tensile strength necessary to separate the cross-lap was 170 lbs. per sq. in.

Normally wood failure begins to occur at a value of about 150 p.s.i. For many purposes, however a bond strength well below this value is wholly satisfactory. It should also be noted that strength usually continues to increase significantly for at least a 24-hour period after initial assembly.

Example 3

Additional resins were made in identical fashion to the resin described in Example 2 except that other isomers of diaminonaphthalene were used in place of 1,8 isomer. The adhesive for testing was made by taking 10 parts by weight of the amine-modified resin and 5 parts of the asbestos-thickened aldehyde hardener. As indicated in Table II, either concentrated hydrochloric acid or a quantity of 50% sodium hydroxide solution was added to bring the pH into the optimum range for rapid cure. Strengths of the cross-laps after 12 minutes press time is indicated in Table II.

TABLE II

| Amine compound | Parts HCl | Parts NaOH | Cross lap strength, p.s.i. |
| --- | --- | --- | --- |
| 1,2-diaminonaphthalene | | | 35 |
| 1,5-diaminonaphthalene | 2.0 | | 147 |
| Do | | 1.0 | 100 |
| 2,7-diaminonaphthalene | 1.5 | | 110 |

The broad range of pH over which the 1,5-diaminonaphthalene gives good performance is seen by the similarity of values when either HCl or NaOH was used.

Example 4

A resin was made in accordance with the procedure of Example 2 using as the amine component 0.305 mole of 1-amino-5-naphthol. An adhesive was made using 10 parts by weight of the resin, 0.5 part of concentrated hydrochloric acid and 5 parts of the asbestos-thickened hardener. When used in a cross-lap test a tensile strength of 221 p.s.i. was developed after 12 minutes.

Example 5

A reaction vessel was charged with 1 part by weight of 1,5-diaminonaphthalene and an equal amount of N,N-dimethylformamide. These were mixed until homogeneous with gentle warming. At this time 3 parts of a urea-formaldehyde resin were added. (Amres 255, a product of Pacific Resins and Chemicals.) Amres 255 is typical of many general purposes liquid ureaformaldeheyde adhesives resins readily available on the market. It is made with an approximate 2 to 1 mole ratio of formaldeheyde to urea and is cooked to a Gardner viscosity of "U" at a pH of 8.0 and contains 65% resin solids in a water solution. When all signs of reaction had ceased the product was cooled to room temperature and placed in storage.

A cross-lap test was carried out using 5 parts by weight of the above resin with 2.5 parts of the asbestos-thickened aldehyde hardener of Example 2 and 0.4 part of concentrated hydrochloric acid. When these were mixed, the resulting adhesive was applied immediately to the cross-lap pieces. After only 4 minutes press time a strength of 55 p.s.i. had developed. The gel time of the composition was 10 seconds.

Example 6

This experiment was conducted to demonstrate the disadvantage of simultaneous reaction of an aminonaphthalene with the reactants used to produce an aldyhde condensation polymer. (As previously suggested, it is generally better to first produce the aldehyde condensation polymer and subsequently react it with the aminonaphthalene.)

The following ingredients were placed in a reactor:

32.5 gms. of 91.4% phenol
0.6 gm. water
7.8 gms. 93.2% flake paraformaldehyde
0.3 gm. calcium acetate monohydrate
20.0 gms. 1-amino-5-naphthol
10.9 gms. methanol Heat was applied, raising the temperature in 20 minutes from 28° C. to 62° C. At this point an exothermic reaction was noted and the application of heat discontinued for 5 minutes. During that period the temperature continued to rise to 70° C. Heat was reapplied to bring the temperature to 83° C. in the next 20 minutes. At that point the mixture suddenly gelled, and was cooled. At 25° C. the product was a granular, unusable mass.

Example 7

This experiment was conducted to demonstrate the use of the resin of this invention with a curing agent comprising an aldehyde-epoxide mixture.

An aldehyde condensation polymer was prepared as follows. The following ingredients were placed in a four-liter reactor:

2,174.0 parts phenol, 90.4%
518.8 parts of 93.5% flake paraformaldehyde
12.0 parts water
21.5 parts calcium acetate monohydrate The above ingredients were mixed together and the temperature of the mixture adjusted to 25° C. The mixture was then heated at a uniform rate over a period of 60 minutes to a final reflux temperature of 110° C. Refluxing was continued for 120 minutes followed by cooling of the resultant reaction product.

An expoxide-aldheyde curing agent was prepared by mixing the following ingredients:

49.08 parts formaldehyde solution (55% formaldehyde in methanol-water solution)
1.84 parts asbestos
49.08 parts epoxy resin made by the epoxidation of a phenol-formaldehyde novolac, the epoxide resin having an average of 2.2 epoxy groups per molecule (DEN 431, an epoxidized novolac, made by the Dow Chemical Co.)

A modified aldehyde condensation resin of this invention was prepared as follows. A mixture of 100 grams of the aldehyde condensation polymer described above and 0.305 mole of 1-amino-5-naphthol were heated to reflux for 2.25 hours, cooled, and then mixed with 26.3 grams of methanol.

The gel time for a mixture of the modified aldehyde condensation resin and the epoxide-aldehyde curing agent was measured as follows. To 10 grams of the resin was added 5 gms. of curing agent. The mixture was stirred rapidly until gelled and the time recorded. Gel time in this case was 180 seconds.

The strength of the modified aldehyde condensation resin as an adhesive was measured as follows. The resin and curing agent were mixed in the same manner as in the determination of gel time, and spread on a wood block before the resin gelled. Another wood block was placed on top of the resin and pressed at 40 p.s.i. for twelve minutes. This was followed by measurement of the tensile force-per-unit area necessary to separate the blocks. In this case a force of 270 p.s.i. was required.

Example 8

This experiment was conducted to demonstrate the use of a curing agent comprising a diisocyanate.

An aldehyde condensation polymer was prepared as described in Example 7. To 61.1 grams of this polymer was added 29.3 grams of 1-amino-5-naphthol. The mixture was heated to reflux at 105° C., and then refluxing was continued for 2½ hours. The mixture was then cooled to 60° C., mixed with 9.6 grams of methanol and further cooled to room temperature.

A 15.0 gram aliquot of the above product was further diluted with 4.0 grams of methanol, and acidified with 1.5 grams of 38% hydrochloric acid. To 2.2 grams of this mixture were added 0.16 gram of the curing agent 2,4-tolylene diisocyanate. This mixture was then rapidly stirred until it gelled after 61 seconds. Next, a fresh mixture of resin and curing agent identical to the one used in the gel time determination was prepared and spread on a wood block which was then covered with a second wood block; the resulting sandwich was pressed at 40 p.s.i. for 12 minutes. A force of 100 p.s.i. was then required to separate the blocks.

What is claimed is:

1. An amine-modified condensation polymer comprising the reaction product of a phenoplast containing reactive alkylol groups with an aminonaphthalene of the formula

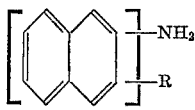

where R may be amino in any open ring position or hydroxyl in the 2, 5 and 8 ring positions when the amino group is in the 1 position; the amount of said amine being at least 0.05 part by weight per part of said phenoplast; said phenoplast comprising an aldehyde condensed with phenol, cresol, resorcinol or phenol-resorcinol; and said reaction product being further reactable at ambient temperatures with a curing agent to form an insoluble, infusible product.

2. The modified polymer of claim 1 wherein said aminonaphthalene is 1,2-diaminonaphthalene.

3. The modified polymer of claim 1 wherein said aminonaphthalene is 1-amino-5-naphthol.

4. The modified polymer of claim 1 wherein said aminonaphthalene is 2,7-diaminonaphthalene.

5. The modified polymer of claim 1 wherein said aminonaphthalene is 1,8-diaminonaphthalene.

6. The modified polymer of claim 1 wherein said aminonaphthalene is 1,5-diaminonaphthalene.

7. The modified polymer of claim 1 wherein said phenoplast is a phenol-formaldehyde resin.

8. The modified polymer of claim 7 wherein said aminonaphthalene is 1,2-diaminonaphthalene, 1-amino-5-naphthol, 2,7-diaminonaphthalene, 1,8-diaminonaphthalene or 1,5-diaminonaphthalene.

9. The modified polymer of claim 8 wherein the amount of said aminonaphthalene is from 0.05 to 2.0 parts by weight per part of said phenoplast.

10. The modified polymer of claim 1 wherein the amount of said aminonaphthalene is at least 0.1 part by weight per part of said phenoplast.

11. The modified polymer of claim 10 wherein said phenoplast is a phenol-formaldehyde resin.

12. The modified polymer of claim 10 wherein said aminonaphthalene is 1,2-diaminonaphthalene, 1-amino-5-naphthol, 2,7-diaminonaphthalene, 1,8-diaminonaphthalene or 1,5-diaminonaphthalene.

13. The modified polymer of claim 1 wherein said phenoplast is a phenol-formaldehyde resole produced by condensing 0.7 to 1.0 mole formaldehyde with 1 mole phenol in the presence of an ortho directing catalyst.

14. The modified polymer of claim 13 wherein the amount of said aminonaphthalene is from 0.1 to 1.0 part by weight per part of said phenoplast.

15. The modified polymer of claim 13 wherein said aminonaphthalene is 1,2-diaminonaphthalene, 1-amino-5-naphthol, 2,7-diaminonaphthalene, 1,8-diaminonaphthalene or 1,5-diaminonaphthalene.

16. The modified polymer of claim 15 wherein the amount of said aminonaphthalene is from 0.1 to 1.0 part by weight per part of said phenoplast.

17. The modified polymer of claim 1 wherein said aldehyde is formaldehyde.

18. A rapid curing adhesive composition comprising
(a) an amine-modified condensation polymer comprising the reaction product of a phenoplast containing reactive alkylol groups with an aminonaphthalene of the formula

where R may be amino in any open ring position or hydroxyl in the 2, 5 and 8 ring positions when the amino group is in the 1 position; the amount of said aminonaphthalene being at least 0.05 part by weight per part of said phenoplast; said phenoplast comprising an aldehyde condensed with phenol, cresol, resorcinol or phenol-resorcinol; and
(b) a curing agent reactable with said modified condensation polymer at ambient temperatures, the amounts of said modified polymer and curing agent being sufficient to cause said composition to rapidly become insoluble and infusible at ambient temperatures.

19. The composition of claim 18 wherein said aminonaphthalene is 1,2-diaminonaphthalene, 1-amino-5-naphthol, 2,7-diaminonaphthalene, 1,8-diaminonaphthalene or 1,5-diaminonaphthalene.

20. The composition of clam 18 wherein said curing agent comprises an alkylene donating compound, a diisocyanate, or an epoxide.

21. The composition of clam 18 wherein said curing agent comprises an alkylene donating compound.

22. The composition of claim 18 wherein said curing agent comprises formaldehyde.

23. The composition of claim 18 wherein the amount of curing agent is from 0.02 to 1.0 part by weight per part by weight of said modified condensation polymer.

24. The composition of claim 18 wherein said phenoplast is a phenol-formaldehyde resin.

25. The composition of claim 24 wherein said aminonaphthalene is 1,2-diaminonaphthalene, 1-amino-5-naphthol, 2,7-diaminonaphthalene, 1,8-diaminonaphthalene or 1,5-diaminonaphthalene.

26. The composition of claim 18 wherein the amount of said aminonaphthalene is from 0.1 to 1.0 part by weight per part of said phenoplast.

27. The composition of claim 18 wherein said phenoplast is a phenol-formaldehyde resole produced by condensing 0.7 to 1.0 mole formaldehyde with 1 mole phenol in the presence of an ortho directing catalyst.

28. The composition of claim 27 wherein said aminonaphthalene is 1,2-diaminonaphthalene, 1-amino-4-naphthol, 2,7-diaminonaphthalene, 1,8-diaminonaphthalene or 1,5-diaminonaphthalene.

29. The composition of claim 28 wherein the amount of said aminonaphthalene is from 0.1 to 1.0 part by weight per part of said phenoplast.

30. A process for the preparation of a rapid curing adhesive comprising
(1) blending together at ambient temperatures
(a) an amine-modified condensation polymer comprising the reaction product of a phenoplast containing reactive alkylol groups with an aminonaphthalene of the formula

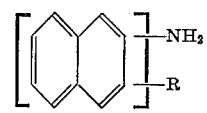

where R may be amino in any open ring position or hydroxyl in the 2, 5 and 8 ring positions when the amino group is in the 1 position; the amount of said amine being at least 0.05 part by weight per part of said phenoplast; said phenoplast comprising an aldehyde condensed with phenol, cresol, resorcinol or phenol-resorcinol; and (b) a curing agent reactable with said modified condensation polymer at ambient temperatures, the amounts of said modified polymer and curing agent being sufficient to cause said composition to rapidly become insoluble and infusible at ambient temperatures; and (2) allowing the resulting blend to cure to an insoluble, infusible state at ambient temperatures.

31. The process of claim 30 wherein said aminonaphthalene is 1,2-diaminonaphthalene, 1 - amino-5-naphthol, 2,7-diaminonaphthalene, 1,8-diaminonaphthalene or 1,5-diaminonaphthalene.

32. The process of claim 30 wherein said curing agent comprises an alkylene donating compound, a diisocyanate or an epoxide.

33. The process of claim 30 wherein said curing agent comprises an alkylene donating compound.

34. The process of claim 30 wherein said curing agent comprises formaldehyde.

35. The process of claim 30 wherein the amount of curing agent is from 0.02 to 1.0 part by weight per part by weight of said modified condensation polymer.

36. The process of claim 30 wherein said phenoplast is a phenol-formaldehyde resin.

37. The process of claim 36 wherein said aminonaphthalene is 1,2-diaminonaphthalene, 1 - amino-5-naphthol, 2,7-diaminonaphthalene, 1,8-diaminonaphthalene or 1,5-diaminonaphthalene.

38. The process of claim 30 wherein the amount of said aminonaphthalene is from 0.1 to 1.0 part by weight per part of said phenoplast.

39. The process of claim 30 wherein said phenoplast is a phenol-formaldehyde resole produced by condensing 0.7 to 1.0 mole formaldehyde with 1 mole phenol in the presence of an ortho directing catalyst.

40. The process of claim 39 wherein said aminonaphthalene is 1,2-diaminonaphthalene, 1-amino-5-naphthol, 2,7-diaminonaphthalene, 1,8-diaminonaphthalene or 1,5-diaminonaphthalene.

41. The process of claim 40 wherein the amount of said aminonaphthalene is from 0.1 to 1.0 part by weight per part of said phenoplast.

42. A process for producing a liquid amine-modified condensation polymer comprising reacting at elevated temperatures a phenoplast containing reactive alkylol groups with an aminonaphthalene of the formula

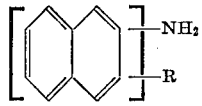

where R may be amino in any open ring position or hydroxyl in the 2, 5 and 8 ring positions when the amino group is in the 1 position; the amount of said aminonaphthalene being at least 0.05 part by weight per part of said phenoplast; said phenoplast comprising an aldehyde condensed with phenol, cresol, resorcinol or phenol-resorcinol; and said modified polymer being liquid and further reactable at ambient temperatures with a curing agent to form an insoluble, infusible polymer.

43. The process of claim 42 wherein said phenoplast is a phenol-formaldehyde resin.

44. The process of claim 42 wherein said aminonaphthalene is 1,2-diaminonaphthalene, 1 - amino-5-naphthol, 2,7-diaminonaphthalene, 1,8-diaminonaphthalene or 1,5-diaminonaphthalene.

45. The process of claim 44 wherein said phenoplast is a phenol-formaldehyde resin.

References Cited

UNITED STATES PATENTS

| | | | |
|---|---|---|---|
| 2,309,088 | 1/1943 | Auer | 260—102 |
| 2,962,442 | 11/1960 | Andress | 260—53 X |
| 2,475,587 | 7/1949 | Bender et al. | 260—57 |
| 3,364,179 | 1/1968 | Kirkpatrick | 260—51.5 |
| 3,376,262 | 4/1968 | Pasky | 260—59 |
| 3,377,317 | 4/1968 | Hoxie | 260—59 |
| 3,398,122 | 8/1968 | Shepard et al. | 260—59 X |
| 3,436,373 | 4/1969 | Cox et al. | 260—51.5 |
| 3,444,137 | 5/1969 | Higginbottom | 260—51.5 |
| 3,459,708 | 8/1969 | Stevens | 260—59 |
| 3,461,099 | 8/1969 | Muzyrko et al. | 260—59 |
| 3,487,046 | 12/1969 | Negrevergne | 260—51.5 |
| 3,509,096 | 4/1970 | Sobel | 260—51.5 |
| 3,546,172 | 12/1970 | Johnson et al. | 260—51.5 |
| 3,558,559 | 1/1971 | LeBlanc | 260—51.5 |
| 3,558,560 | 1/1971 | Huck et al. | 260—59 |
| 3,563,952 | 2/1971 | Schmoll | 260—59 |
| 3,678,103 | 7/1972 | Huck | 260—51.5 |
| 3,275,605 | 9/1966 | Eastes et al. | 260—70 |
| 3,309,341 | 3/1961 | Abrahams et al. | 260—70 |
| 3,489,718 | 1/1970 | Goullon et al. | 260—70 |
| 3,630,998 | 12/1971 | Schibler | 260—67.6 |
| 3,689,463 | 9/1972 | Kruglikov et al. | 260—70 |
| 3,645,973 | 2/1972 | Schibler | 260—67.5 |
| 2,287,756 | 6/1942 | Brookes | 260—67.5 |

FOREIGN PATENTS

| | | |
|---|---|---|
| 615,335 | 1/1949 | Great Britain. |

OTHER REFERENCES

Phenolic Resins, Whitehouse, 1967, pp. 3–5, 7–8 and 32–33.

Modern Plastics Encyclopedia, 1968, pp. 9, 13, 141–144, 183–184.

HOWARD E. SCHAIN, Primary Examiner

U.S. Cl. X.R.

161—261, 262; 260—67.6 R, 69 N, 64, 70 R, 828, 831; 210—834